(12) United States Patent
Tachi (10) Patent No.: US 10,807,820 B2
(45) Date of Patent: Oct. 20, 2020

(54) IMAGE PROCESSING APPARATUS, CONTROL METHOD, AND STORAGE MEDIUM TO PROVIDE A PREVIEW SCREEN CONCERNING DOUBLE FEEDING

(71) Applicant: CANON KABUSHIKI KAISHA, Tokyo (JP)

(72) Inventor: Daiki Tachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/550,065

(22) Filed: Aug. 23, 2019

(65) Prior Publication Data

US 2020/0071103 A1 Mar. 5, 2020

(30) Foreign Application Priority Data

Sep. 3, 2018 (JP) .................. 2018-164246

(51) Int. Cl.
*G06F 3/12* (2006.01)
*B65H 7/12* (2006.01)
*H04N 1/00* (2006.01)

(52) U.S. Cl.
CPC ............. *B65H 7/12* (2013.01); *G06F 3/1256* (2013.01); *H04N 1/0044* (2013.01)

(58) Field of Classification Search
CPC .... B65H 7/12; H04N 1/0044; H04N 1/00013; H04N 1/00037; H04N 1/00076; H04N 1/32625; H04N 1/3263; G06F 3/1256
See application file for complete search history.

(56) References Cited

U.S. PATENT DOCUMENTS

2012/0268771 A1* 10/2012 Kruizinga .......... H04N 1/00029
358/1.14
2017/0013140 A1* 1/2017 Tachibana .......... H04N 1/00037
2017/0279997 A1* 9/2017 Ozawa ............... H04N 1/00925

FOREIGN PATENT DOCUMENTS

JP 2008-271537 A 11/2008

* cited by examiner

*Primary Examiner* — Kent Yip
(74) *Attorney, Agent, or Firm* — Canon U.S.A., Inc. I.P. Division

(57) ABSTRACT

A preview screen includes a message indicating that double feeding of documents (i.e., sheets) has been detected, and image data corresponding to one or more read documents if the double feeding of documents is detected, and further provides a countermeasure method to the double feeding of documents in the preview screen.

10 Claims, 9 Drawing Sheets

IMAGE PROCESSING APPARATUS, CONTROL METHOD, AND STORAGE MEDIUM TO PROVIDE A PREVIEW SCREEN CONCERNING DOUBLE FEEDING

BACKGROUND

Field

The present disclosure relates to an image processing apparatus with a configuration for reading documents, a control method for the image processing apparatus, and a storage medium.

Description of the Related Art

Conventionally, there are image processing apparatuses that separately convey a plurality of documents placed on a platen one by one to a conveyance path to continuously read the documents. Such an image processing apparatus can include a unit for detecting double feeding of documents (i.e., paper sheets). As for some of such image processing apparatuses, a user can set a function of detecting double feeding of documents by selecting "ON" (enabled) or "OFF" (disabled) of the function.

In a case where a user sets a double feed detection function to ON, when the image processing apparatus detects that double feeding of documents has occurred during document conveyance, the image processing apparatus stops an operation of a scanner, and notifies the user that the reading error has occurred. On the other hand, in a case where the user sets the double feed detection function to OFF, the image processing apparatus continues to read documents and create image data even when double feeding of documents occurs.

Errors to be detected during scan processing include a jam in addition to the double feeding of documents. The jam is an error in which a document is jammed in a middle portion of a conveyance path for scan processing. When a jam occurs, a user is notified that a reading error has occurred. In this case, the scan processing cannot be resumed unless the user removes the jammed document from the conveyance path, unlike a case where double feeding of documents is detected.

Japanese Patent Application Laid-Open No. 2008-271537 discusses a selection that can be made for a case where detection of double feeding is notified as an error. Specifically, as for the selection, a user can select whether image reading is to be resumed from documents where double feeding has been detected, image reading is to be resumed from a next document of the documents where double feeding has been detected, or the entire image reading is to be stopped (canceled).

If double feeding of documents is detected, it is conceivable to check whether a problem, such as a position shift, has also occurred on an image of a document that are already read in addition to the double-fed documents.

SUMMARY

According to the aforementioned known technique, adequate user assistance is not provided in consideration of the problem described above.

According to an aspect of the present disclosure, an image processing apparatus includes a scanner, a document feeder configured to convey a plurality of sheets to be read by the scanner, a sensor configured to detect double feeding of sheets conveyed by the document feeder, at least one memory storing instructions, and at least one processor executing the instructions causing the image processing apparatus to provide, if double feeding of sheets is detected by the sensor, a preview screen including a message indicating that the double feeding has been detected and image data corresponding to one or more sheets read by the scanner, and to provide a first option to cancel reading processing of a plurality of sheets including the one or more sheets in the image processing apparatus, and a second option to perform re-read processing based on a designated page corresponding to a sheet that is read by the scanner prior to the sheets of the detected double feeding.

Further features of the present disclosure will become apparent from the following description of exemplary embodiments with reference to the attached drawings.

DESCRIPTION OF THE EMBODIMENTS

Hereinafter, exemplary embodiments are described with reference to the drawings.

The following exemplary embodiments are not intended to limit the scope of the claims, and not all of the combinations of the aspects that are described in the following embodiments are necessarily required with respect to an issue to be solved.

Figure 1:
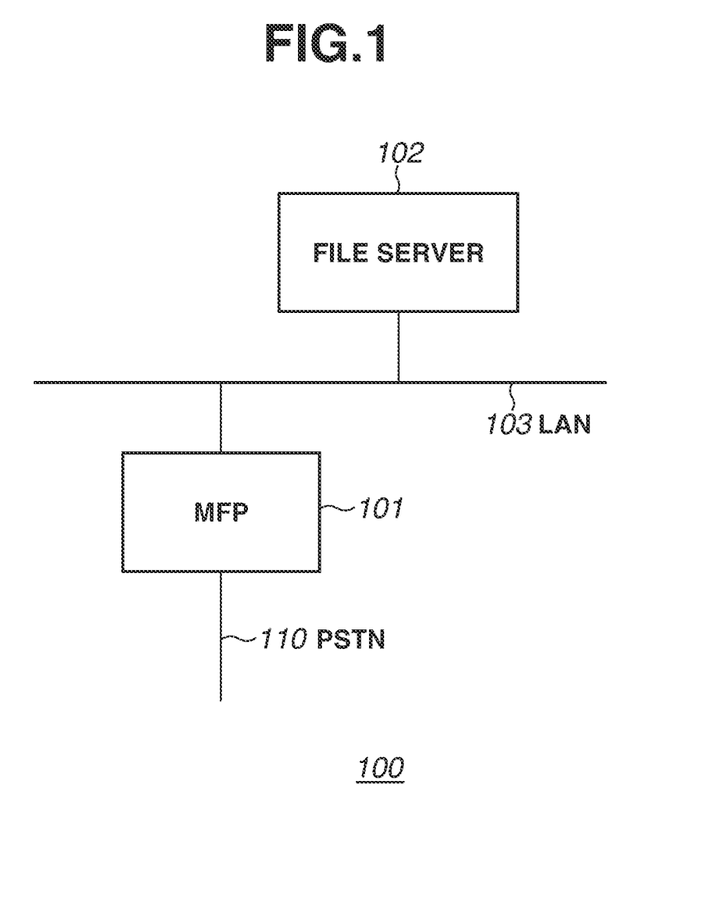
FIG. 1 is a block diagram illustrating an entire image processing system.

FIG. 1 is a block diagram illustrating an entire image processing system 100.

As illustrated in FIG. 1, a multifunctional peripheral (MFP) 101 and a file server 102 are communicably connected to each other on a local area network (LAN) 103.

Herein, the MFP 101 is an example of an image processing apparatus, whereas the file server 102 is an example of a file management apparatus.

The MFP 101 uses a protocol, such as a server message block (SMB) protocol and a file transfer protocol (FTP), to transmit an image data file to a folder inside the file server 102 as a destination. The MFP 101 can also set a folder inside a client personal computer (PC) (not illustrated) as a destination in addition to the file server 102.

Further, the MFP 101 can transmit image data by electronic mail via a mail server (not illustrated).

In the present exemplary embodiment, the image processing system 100 includes the MFP 101 and the file server 102. However, only the MFP 101 can be referred to as an image processing system.

Figure 2:
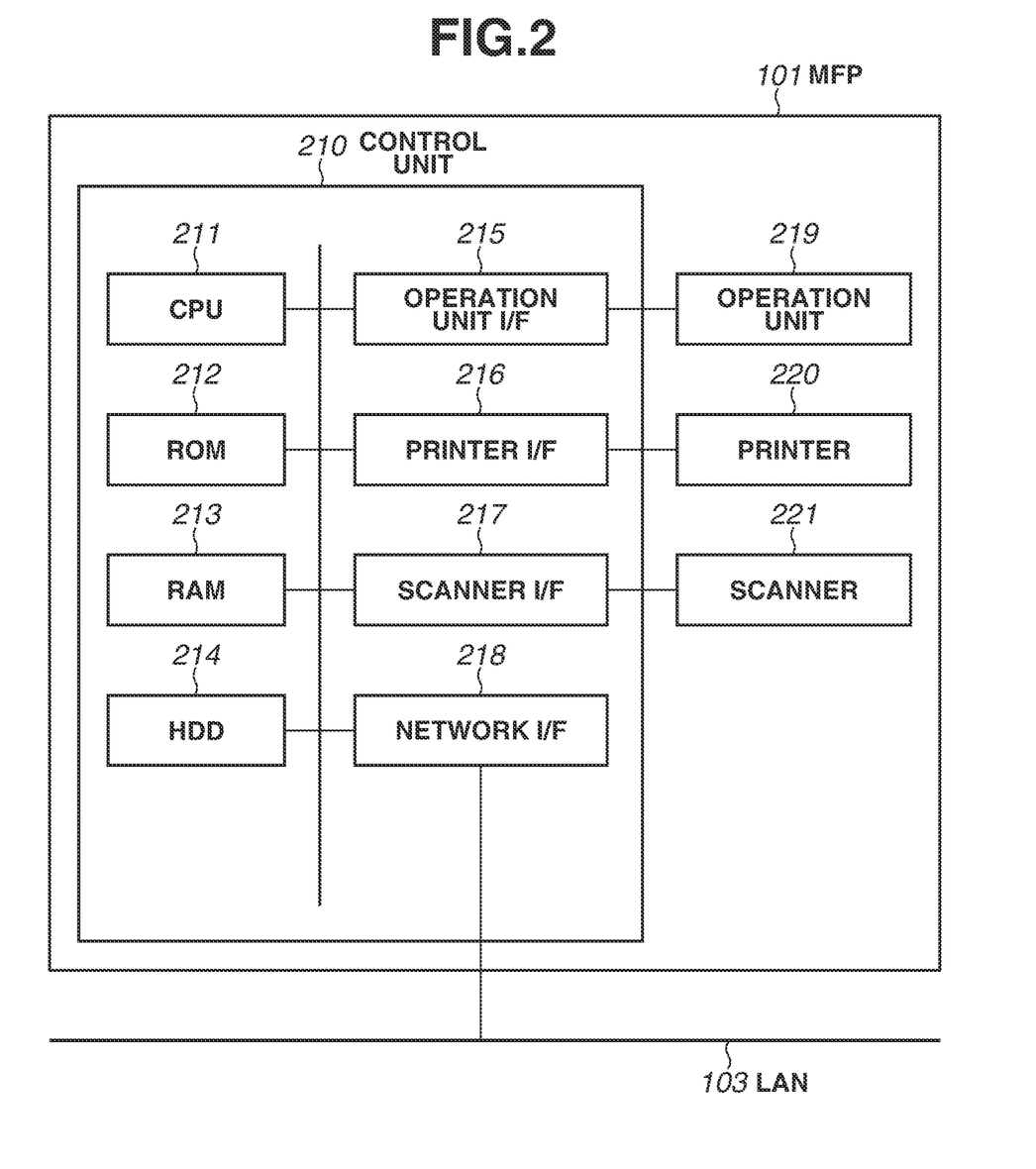
FIG. 2 is a block diagram illustrating a configuration of a multifunctional peripheral (MFP).

FIG. 2 is a block diagram illustrating a configuration of the MFP 101.

The MFP 101 includes a control unit 210 that includes a central processing unit (CPU) 211. The control unit 210 controls operations of the entire MFP 101.

The CPU 211 reads out a control program stored in a read only memory (ROM) 212 to perform various types of control such as reading control and transmission control.

A random access memory (RAM) 213 is used as a main memory and a temporary storage area such as a work area of the CPU 211.

In a case where the image processing apparatus is the MFP 101, one CPU 211 uses one memory (i.e., the RAM 213 or a hard disk drive (HDD) 214) to execute processing of each step described below with reference to a flowchart illustrated in FIG. 6.

Further, another configuration may be applied for executing processing of each step. For example, a plurality of CPUs and a plurality of RAMs or HDDs can cooperate with each other to execute processing of each step of the flowchart illustrated in FIG. 6.

The HDD 214 stores image data and various programs.

An operation unit interface (I/F) 215 connects an operation unit 219 to the control unit 210. The operation unit 219 includes a keyboard and a liquid crystal display unit having a touch panel function.

A printer I/F 216 connects a printer 220 to the control unit 210. Image data to be printed by the printer 220 is transferred from the control unit 210 via the printer I/F 216, and then printed on a recording medium by the printer 220.

A scanner I/F 217 connects a scanner 221 to the control unit 210. The scanner 221 reads images on documents continuously conveyed by, for example, an automatic document feeder (ADF) to generate image data from the read information. Accordingly, the scanner 221 can create a file including the image data generated for each document, and store the created file into the HDD 214. The scanner 221 inputs the image data to the control unit 210 via the scanner I/F 217. The MFP 101 can perform file transmission or mail transmission of a file including the image data converted by the scanner 221.

The scanner 221 includes a double feed detection unit (not illustrated) for detecting an occurrence of double feeding of documents. When documents to be continuously conveyed are doubly conveyed (double-fed), the double feed detection unit detects double feeding of two or more paper sheets included in an original.

A network I/F 218 connects the control unit 210 (the MFP 101) to a LAN 103. The network I/F 218 transmits image data or information to an external device (e.g., the file server 102) on the LAN 103, and receives various pieces of information from the external device on the LAN 103.

Figure 3:
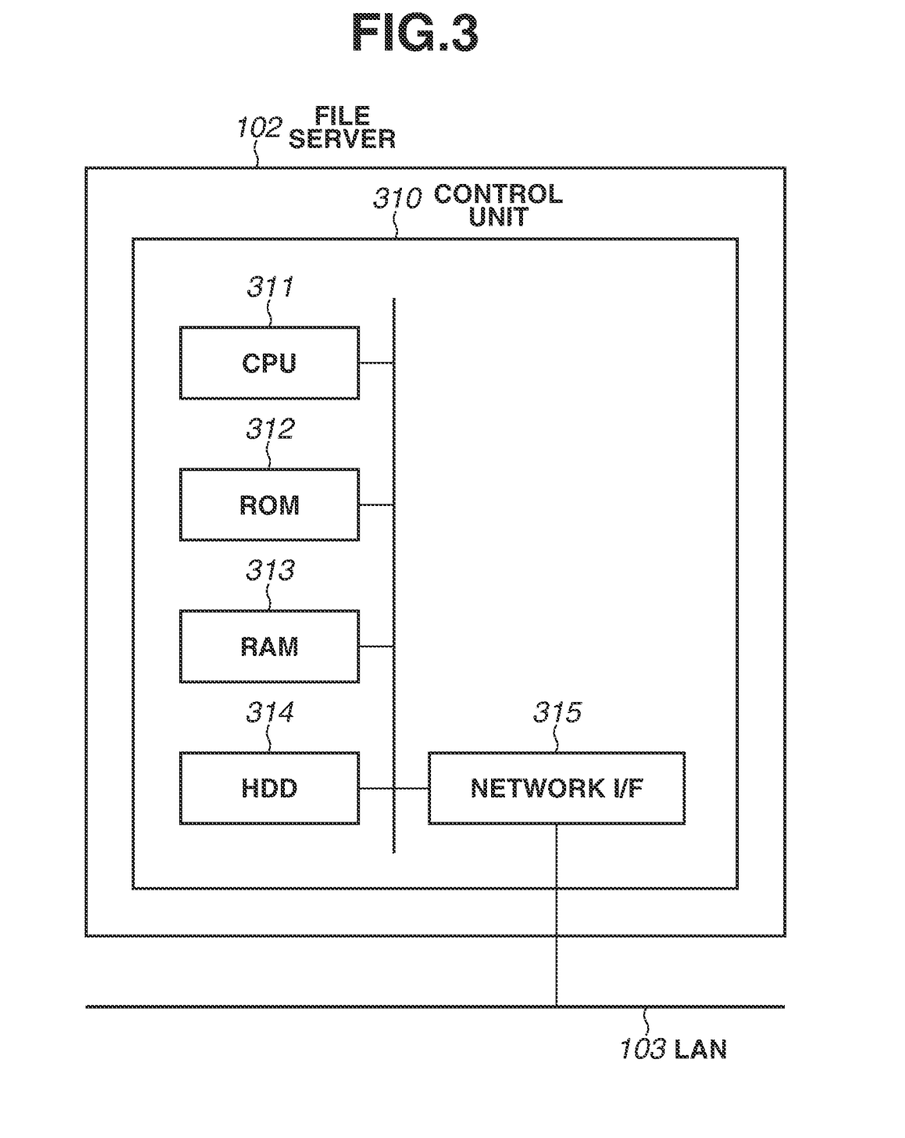
FIG. 3 is a block diagram illustrating a configuration of a file server.

FIG. 3 is a block diagram illustrating a configuration of the file server 102.

The file server 102 includes a control unit 310 that includes a CPU 311. The control unit 310 controls operations of the entire file server 102.

The CPU 311 reads out a control program stored in ROM 312 to execute various kinds of control processing.

A RAM 313 is used as a main memory and a temporary storage area such as a work area of the CPU 311.

An HDD 314 stores image data and various programs.

A network I/F 315 connects the control unit 310 (the file server 102) to the LAN 103. The network I/F 315 transmits and receives various pieces of information to and from other devices on the LAN 103.

Figure 4:
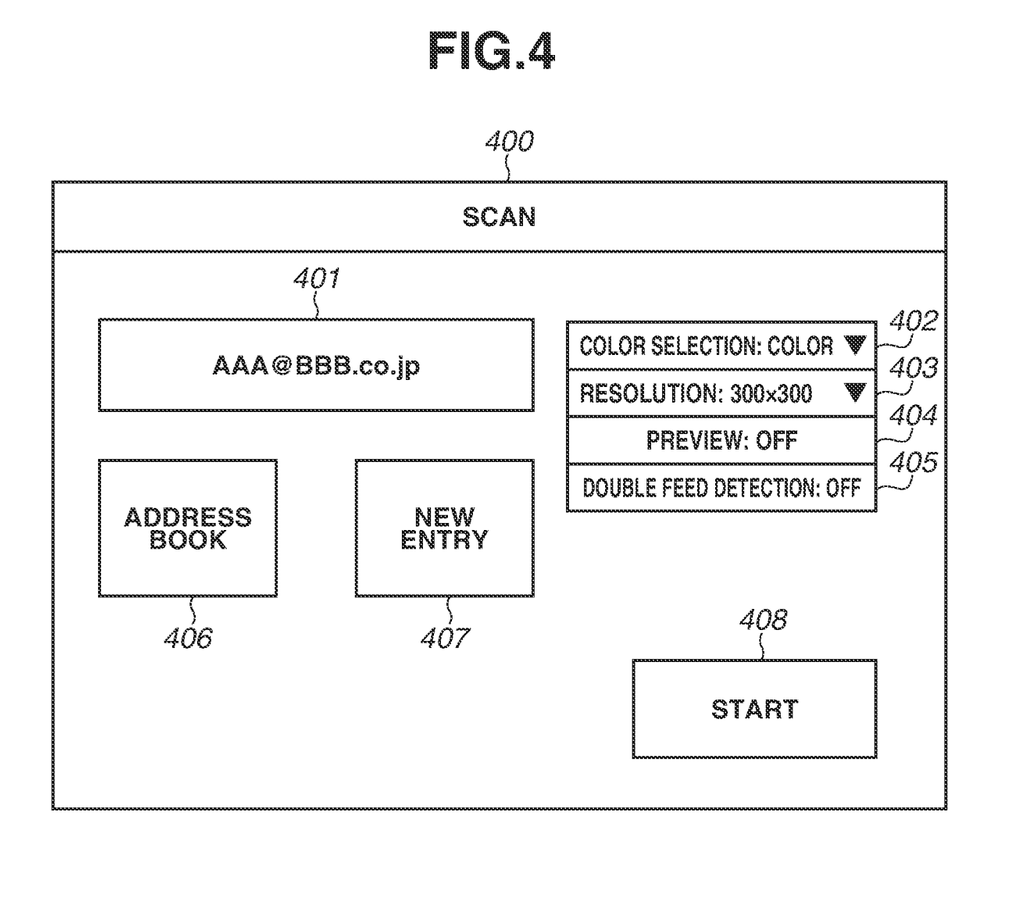
FIG. 4 is a diagram illustrating an example of an operation screen that is displayed when a destination is set.

FIG. 4 illustrates an example of an operation screen 400 that is displayed on the operation unit 219 of the MFP 101 to set a destination. The operation screen 400 illustrated in FIG. 4 is displayed when file transmission or mail transmission is executed for image data generated by reading a document by the scanner 221.

In a display area 401, a destination to which image data is to be transmitted is displayed. In the present exemplary embodiment, a destination that is designated in a display area 406 or 407 described below is displayed in the display area 401.

In a display area 402, an operation key is displayed to select a color setting to be applied when the scanner 221 reads a document. In the MFP 101 according to the present exemplary embodiment, any color setting can be selected from color, gray scale, or automatic. Another color setting may be included as an option.

A user can select a desired color setting from options displayed in a drop-down form in the display area 402.

In a display area 403, an operation key is displayed to select a resolution to be applied when the scanner 221 reads a document. In the MFP 101 according to the present exemplary embodiment, any resolution can be selected from 100×100, 200×200, or 300×300. Another resolution may be included as an option.

The user can select a desired resolution from options displayed in a drop-down form in the display area 403.

In a display area 404, a selection key is displayed to select whether to display a preview screen of image data read by the scanner 221 on the operation unit 219.

In a case where the user sets the preview screen display to ON, after the scanner 221 reads a document, an image on the read document is displayed on the operation unit 219. In a case where the user sets the preview screen display to OFF, even after the scanner 221 reads the document, the image on the read document is not displayed on the operation unit 219.

In a display area 405, a selection key is displayed to select whether to stop an operation of the scanner 221 when documents are double-fed at the time of document reading by the scanner 221.

In a case where the user sets a double feed detection function to enabled (ON), the MFP 101 stops operating the scanner 221 to terminate the scanning processing when documents are double-fed. In a case where the user sets a double feed detection function to disabled (OFF), the MFP 101 does not stop operating the scanner 221 even when documents are double-fed, and document reading and image data creation continue.

In a display area 406, a list of destinations stored in the HDD 214 of the MFP 101 is displayed. If the user selects one destination from the destination list displayed in the display area 406, the selected destination is displayed in the display area 401.

In a display area 407, a screen for inputting a destination to which image data is to be transmitted is displayed. If the user inputs a destination in the display area 407, the input destination is displayed in the display area 401.

In a display area 408, a start key is displayed for executing document reading or image data transmission based on a setting input in the operation screen 400 illustrated in FIG. 4. If the user presses the start key, document reading or image data transmission is started.

Figure 5:
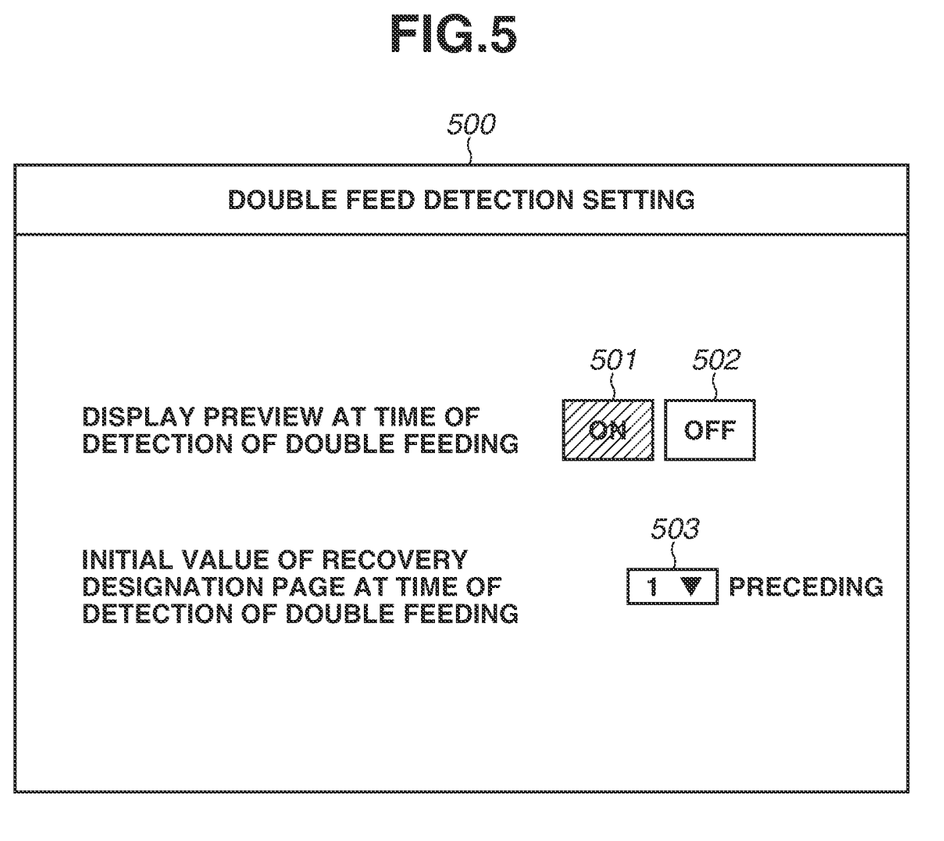
FIG. 5 is a diagram illustrating an example of an operation screen that is displayed when double feed detection is set.

FIG. 5 illustrates an example of an operation screen 500 that is displayed on the operation unit 219 of the MFP 101. The operation screen 500 is used to set processing to be performed when double feeding of documents is detected. The operation screen 500 is displayed when the user sets, in advance, an operation to be performed by the MFP 101 at the time of detection of double feeding.

In display areas 501 and 502, selection keys are displayed for setting a function for forcibly displaying a preview screen to enabled (ON) or disabled (OFF) when double feeding of documents is detected.

If the user presses a selection key displayed in the display area 501, a preview display is set to ON. In this case, when the MFP 101 detects double feeding of documents, a preview screen is always displayed even if a preview display is set to OFF in the display area 404 on the operation screen 400 illustrated in FIG. 4.

On the other hand, if the user presses a selection key displayed in the display area 502, a preview display is set to OFF. In this case, even if the MFP 101 detects double feeding of documents, a preview screen is not forcibly displayed. Whether the preview screen is displayed or not depends on the preview display that has been set in display area 404 on the operation screen 400 illustrated in FIG. 4.

In a display area 503, an operation key in a drop-down form is displayed for designating, in advance, a first page on which document reading is to be resumed (recovered) when the MFP 101 detects double feeding of documents. The user can select a desired page from options displayed in the drop-down form in the display area 503. In a control shown in the display area 503, a numeric value "1" is designated as a default. The numeric value "1" indicates a document that is 1 page preceding a document where double feeding of documents has been detected.

Such a function is provided because a shift in reading can be started from a document that is read before double feeding of documents occurs. That is, if double feeding of documents occurs, a shift in reading may not always occur first in documents where double feeding of documents occurs.

Figure 7:
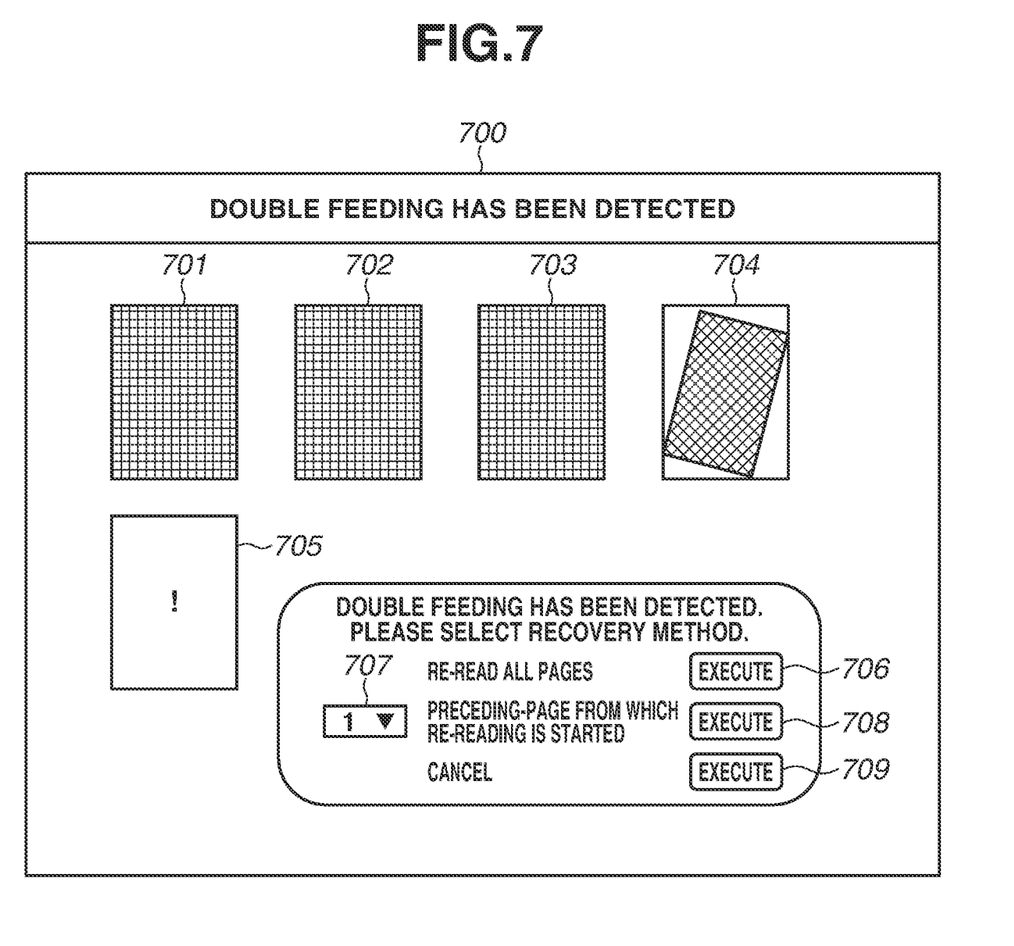
FIG. 7 is a diagram illustrating an example of an operation screen that is displayed when a recovery method is set.

In the present exemplary embodiment, a value designated in an operation screen 700 described below is displayed as an initial value. As described below, the initial value can be changed in the operation screen 700.

Figure 6:
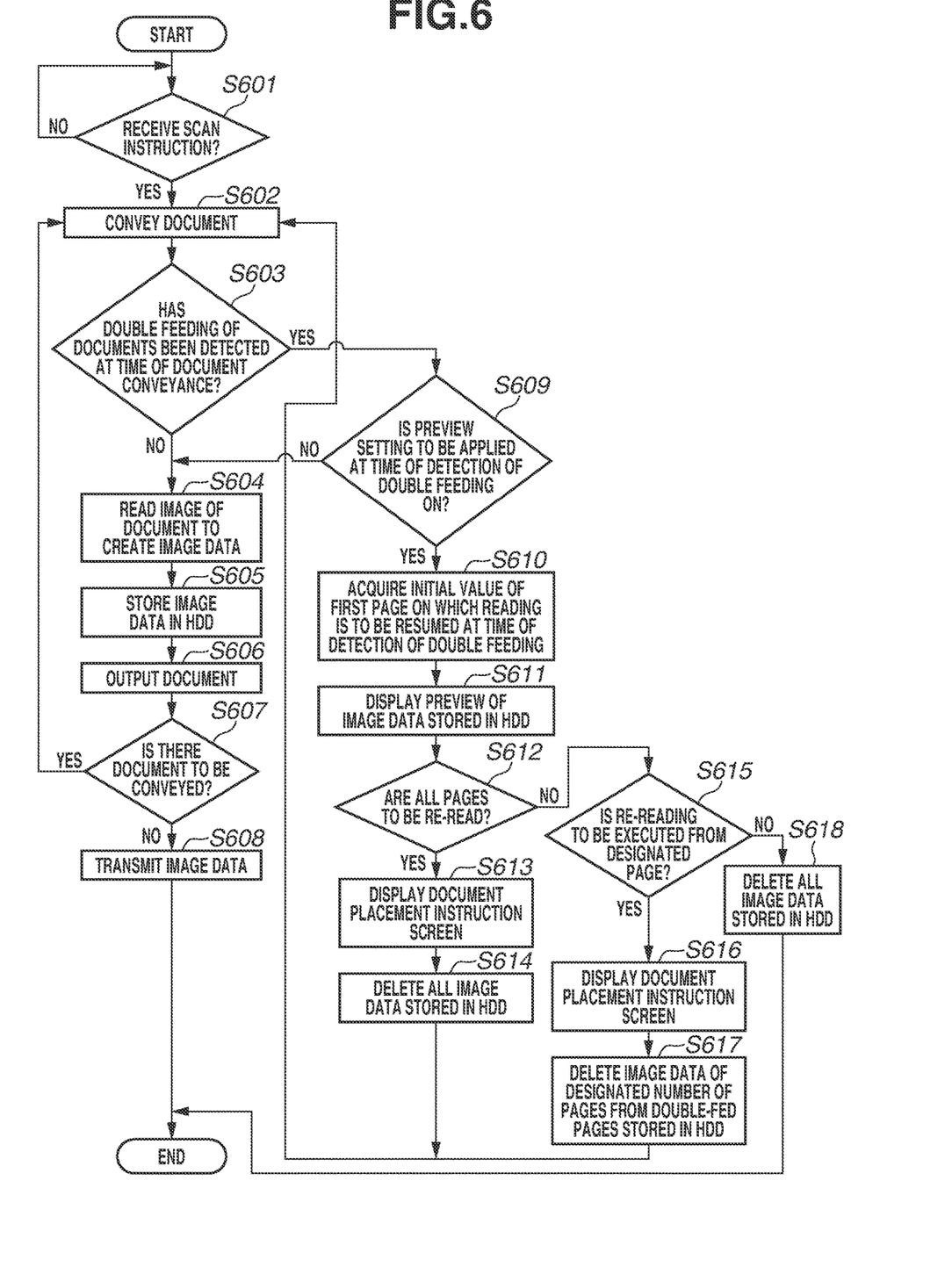
FIG. 6 is a flowchart illustrating operations performed by the MFP.

FIG. 6 is a flowchart illustrating operations performed by the MFP 101 from reading of a document by the scanner 221 to transmission of image data.

The CPU 211 of the MFP 101 executes a control program stored in the HDD 214, and thereby each operation (step) described with reference to the flowchart illustrated in FIG. 6 is performed. When the flowchart illustrated in FIG. 6 begins, documents are placed on a document feeder of the scanner 221.

In step S601, the MFP 101 is on standby until a user presses a start key displayed in the display area 408 on the operation screen 400 illustrated in FIG. 4. When the user presses the start key (YES in step S601), the operation proceeds to step S602.

In step S602, the MFP 101 starts conveying documents to read the documents placed on the document feeder of the scanner 221. When one document is conveyed, the operation proceeds to step S603. In step S603, the MFP 101 determines whether double feeding of the conveyed sheets has occurred.

If the double feeding has not occurred (NO in step S603), the operation proceeds to step S604. If the double feeding has occurred (YES in step S603), the operation proceeds to step S609.

In step S604, the MFP 101 causes the scanner 221 to read an image on the conveyed document and convert the read image into image data. Upon completion of the image data creation, the operation proceeds to step S605.

In step S605, the MFP 101 stores the image data created in step S604 into the HDD 214. Upon completion of the storage of the image data, the operation proceeds to step S606.

In step S606, the MFP 101 outputs the read document from the document feeder of the scanner 221. Upon completion of the document output, the operation proceeds to step S607.

In step S607, the MFP 101 checks whether a document remains in the document feeder.

If there is a document in the document feeder (YES in step S607), the operation returns to step S602. If there is no document in the document feeder (NO in step S607), the operation proceeds to step S608.

In step S608, the MFP 101 transmits all of created image data to a destination displayed in the display area 401 on the operation screen 400 illustrated in FIG. 4. Then, the operations of the flowchart ends.

In step S609, the MFP 101 checks a setting in the display area 501 or 502 on the operation screen 500 for a double feed detection setting illustrated in FIG. 5.

If a preview display has been set to ON by selection of the display area 501 on the operation screen 500 illustrated in FIG. 5 (YES in step S609), the operation proceeds to step S610. If a preview display has been set to OFF by selection of the display area 502 (NO in step S609), the operation proceeds to step S604.

In step S610, the MFP 101 acquires an initial value of a first page on which document reading is to be resumed (recovered) at the time of detection of double feeding of documents. Then, the operation proceeds to step S611.

In step S611, the MFP 101 provides a display of a preview screen (FIG. 7) for image data of all the read documents. Subsequently, in step S612, the MFP 101 waits for an input from the user via the operation screen 700 illustrated in FIG. 7.

FIG. 7 is a diagram illustrating an example of the operation screen 700 provided to the operation unit 219 of the MFP 101 to set a recovery method. The operation screen 700 illustrated in FIG. 7 is displayed when the MFP 101 detects double feeding of documents.

In a top portion of the operation screen 700, a message indicating that double feeding of documents has been detected is displayed.

In display areas 701 through 704, image data is displayed. The image data to be displayed in the display areas 701 through 704 is created by reading a document by the scanner 221 in step S604 and stored in the HDD 214 in step S605.

In the present exemplary embodiment, image data of one or more documents that have been normally read by the scanner 221 is displayed in the display areas 701 through 703, whereas image data of a document that has been shifted at the time of reading is displayed in the display area 704.

In a display area 705, a thumbnail of the double-fed documents detected in step S603 illustrated in FIG. 6 is displayed. In the present exemplary embodiment, since the scanner 221 stops at a time of detection of double feeding of documents, image data of the double-fed documents is not created. Thus, a display about the double-fed documents is provided such that the occurrence of double feeding of documents can be identified. In the present exemplary embodiment, an exclamation mark "!" is displayed. However, the occurrence of double feeding of documents can be displayed by another style.

In display areas 706 through 709, operation keys for resuming (recovering) document reading if double feeding of documents occurs are displayed. The user can operate the operation keys in the display areas 706 through 709 to select a countermeasure method to be taken when double feeding of documents is detected, from options displayed in the display areas.

In the display area 706, an execution key is displayed for executing deletion of all image data that has been created and reading of all the documents again.

In the display areas 707 and 708, an operation key and an execution keys are respectively displayed to perform re-reading of documents from a designated page.

In a control shown in the display area 707, an operation key is displayed so that a document preceding how many pages from the double-fed documents displayed in the display area 705 is designated as a document from which reading is to be resumed. The user can designate an optional number as a start document from which re-reading of documents is started from options displayed in a drop-down form. An initial value to be displayed at this time is a value designated in the display area 503 of the operation screen 500 illustrated in FIG. 5.

In the display area 708, an execution key to be pressed to execute reading of documents from the document the page of which is designated in the display area 707 is displayed.

In a case where double feeding of documents occurs, a shift in a document of a page preceding a document where the double feeding of documents is detected may occur. The shift in the preceding document may have already occurred when reading is performed. Accordingly, in the present exemplary embodiment, a setting is made such that reading can be performed from a page preceding pages on which double feeding of documents has occurred.

In the display area 709, an execution key for instructing cancellation of reading image data is displayed.

The description returns to FIG. 6. On the operation screen 700 displayed in step S611, when the user presses the execution key displayed in the display area 706, the MFP 101 determines, in step S612, that all pages are to be re-read. Then, the operation proceeds to step S613.

On the other hand, on the operation screen 700 displayed in step S611, when the user presses the execution key displayed in ether the display area 708 or 709, the operation proceeds to step S615.

If the execution key in the display area 706 on the operation screen 700 is pressed (YES in step S612), the operation proceeds to step S613. In step S613, the MFP 101 displays a screen (FIG. 8) to instruct the user to place all of the documents again in the document feeder.

Figure 8:
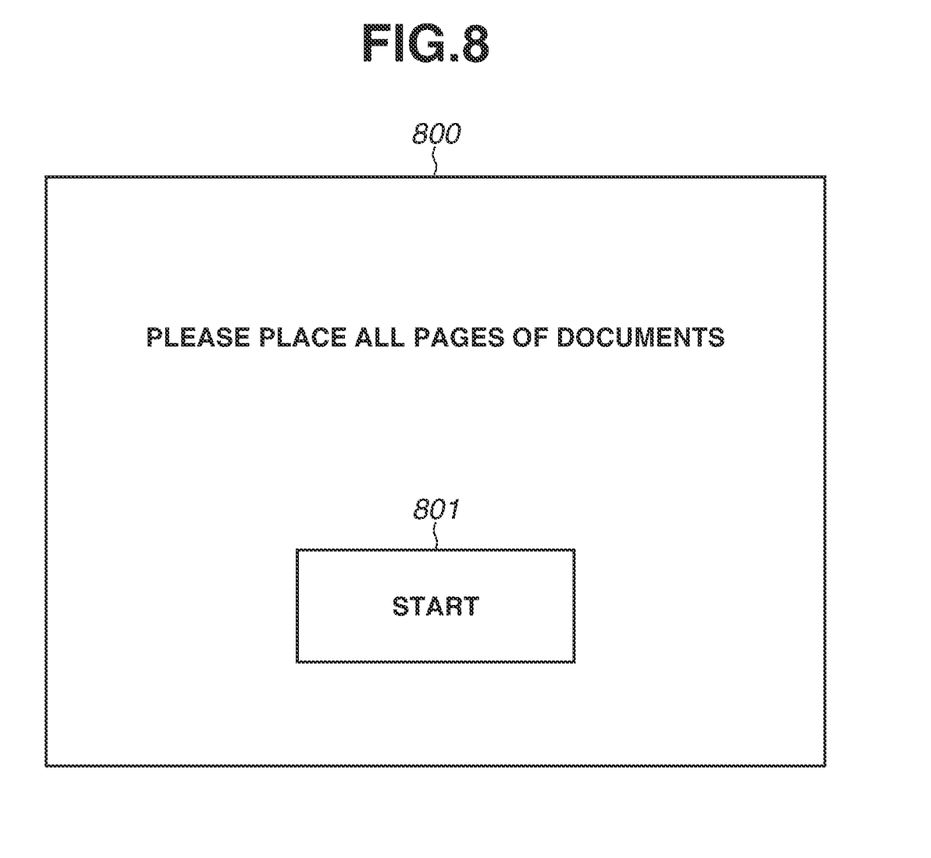
FIG. 8 is a diagram illustrating an example of an operation screen that is displayed when re-reading of all documents is instructed.

FIG. 8 illustrates an example of an operation screen 800 that is displayed on the operation unit 219 of the MFP 101 to instruct the user to place all of the documents for re-reading. The operation screen 800 illustrated in FIG. 8 is displayed if the execution key displayed in the display area 706 on the operation screen 700 illustrated in FIG. 7 is pressed.

In a display area 801, a start key for executing reading of a document by the scanner 221 is displayed.

The description returns to FIG. 6. In step S613, if the start key displayed in the display area 801 on the operation screen 800 is pressed, the operation proceeds to step S614.

In step S614, the MFP 101 deletes all of the image data stored in the HDD 214, and then the operation returns to step S602.

On the operation screen 700 displayed in step S611, if the execution key displayed in either the display area 708 or 709 is pressed on the operation screen 700 (NO in step S612), the operation proceeds to step S615. In step S615, the MFP 101 determines whether the execution key displayed in the display area 708 has been pressed.

If the execution key displayed in the display area 708 on the operation screen 700 illustrated in FIG. 7 is pressed (YES in step S615), the MFP 101 determines that re-reading is to be executed from a designated page, and the operation proceeds to step S616.

In step S616, the MFP 101 displays a screen (FIG. 9) for instructing the user to place documents from the designated page on the document feeder.

Figure 9:
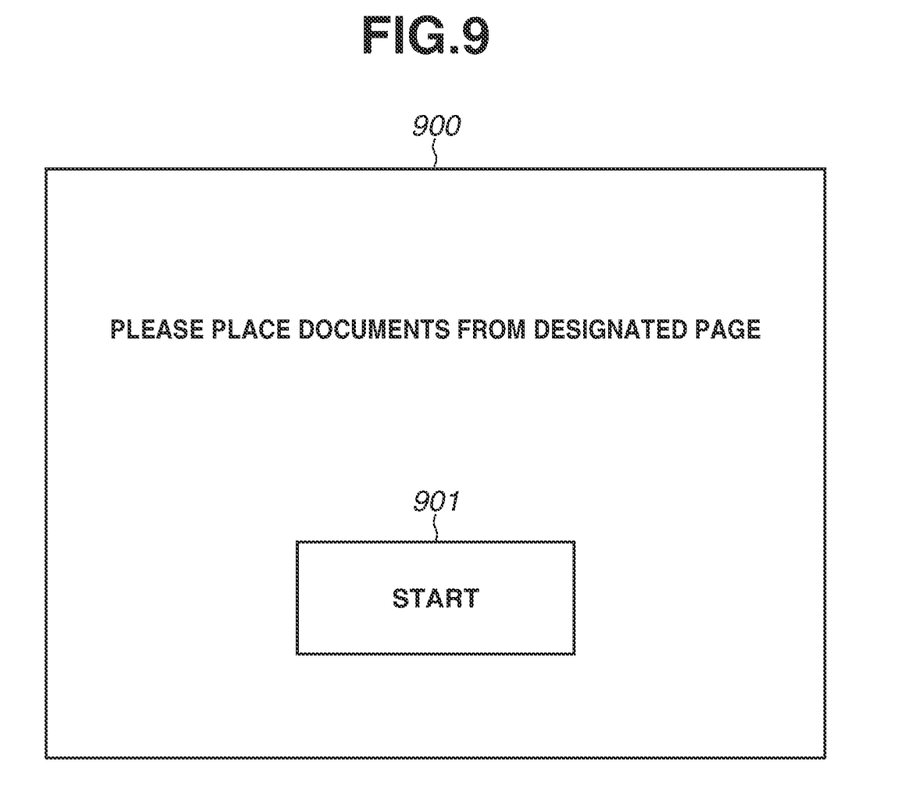
FIG. 9 is a diagram illustrating an example of an operation screen that is displayed when re-reading of documents from a designated page is instructed.

FIG. 9 illustrates an example of an operation screen 900 that is displayed on the operation unit 219 of the MFP 101 to instruct the user to place documents from the designated page for re-reading. The operation screen 900 illustrated in FIG. 9 is displayed if the execution key displayed in the display area 708 on the operation screen 700 illustrated in FIG. 7 is pressed.

In a display area 901, a start key for executing reading of documents by the scanner 221 is displayed.

The description returns to FIG. 6. If the start key displayed in the display area 901 on the operation screen 900 displayed in step S616 is pressed, the operation proceeds to step S617.

In step S617, the MFP 101 deletes a part of the previous image data stored in the HDD 214. Particularly, in the previous image data, data from the double-fed pages to a page corresponding to the designated number is deleted. Then, the operation returns to step S602.

If the execution key displayed in the display area 709 is pressed (NO in step S615), the MFP 101 determines that the reading is cancelled, and the operation proceeds to step S618.

In step S618, the MFP 101 deletes all of the image data stored in the HDD 214. Then, the operation of the flowchart illustrated in FIG. 6 ends.

Application Example

The MFP 101 has a scan preview function separately from a setting by which a double feed detection setting is enabled or disabled. This function is provided to display a thumbnail or a reduced image of generated image data on the operation screen 700 while scanning is being performed or after scanning of all documents set as reading targets is completed.

Herein, assuming that the scan preview function is enabled, and the user sets a double feed detection setting in the display area 405 illustrated in FIG. 4 to disabled (OFF). In such a case, if double feeding of documents occurs partway through scan processing, image data of a portion that has been double-fed is also displayed on an operation screen 700 subsequent to completion of the scanning of all documents. Herein, if a message as illustrated in FIG. 7 is not provided, there is a concern that the user may not know a recovery method or may not notice a poor-quality image due to the double feeding of documents. That is, it can be said that a scan preview function may not be sufficiently utilized.

In the present application example, even if a double feed detection setting in the display area 405 is disabled (OFF), the MFP 101 internally makes a setting such that double feed detection is automatically executed as long as the scan preview function is enabled. Accordingly, a notice indicating that double feeding of documents may have occurred can be provided in a preview screen on the operation screen 700 displayed subsequent to the completion of scanning. Moreover, the recovery method illustrated in FIG. 7 can also be displayed in the preview screen.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-164246, filed Sep. 3, 2018, which is hereby incorporated by reference herein in its entirety.

What is claimed is:

1. An image processing apparatus, comprising:
a scanner;
a document feeder configured to convey a plurality of sheets to be read by the scanner;
a sensor configured to detect double feeding of sheets conveyed by the document feeder;
at least one memory storing instructions; and
at least one processor executing the instructions causing the image processing apparatus to perform operations including:
setting provision of a preview screen to enabled or disabled,
providing, if double feeding of sheets is detected by the sensor, a preview screen including a message indicating that the double feeding has been detected and image data corresponding to one or more sheets read by the scanner, and
providing a first option to cancel reading processing of the plurality of sheets including the one or more sheets in the image processing apparatus, and providing a second option to perform re-read processing based on a designated page corresponding to a sheet that is read by the scanner prior to the sheets corresponding to the detected double feeding,
wherein, even if the provision of the preview screen is set to disabled, the preview screen including the message and the image data is provided if double feeding of sheets is detected by the sensor.

2. The image processing apparatus according to claim 1, wherein providing the second option includes providing a control to optionally designate a re-reading start page.

3. The image processing apparatus according to claim 2, wherein, in the provided control, re-reading is designated so as to be started, as a default, from a sheet 1 page preceding the sheets corresponding to the detected double feeding.

4. The image processing apparatus according to claim 1, wherein providing includes providing a third option to re-read all sheets.

5. The image processing apparatus according to claim 1, wherein, in the preview screen, an image is further provided with which the sheets corresponding to the detected double feeding are identifiable.

6. The image processing apparatus according to claim 1, wherein, if the double feeding is detected, reading of remaining sheets is interrupted.

7. The image processing apparatus according to claim 1, wherein the document feeder conveys the plurality of sheets continuously.

8. The image processing apparatus according to claim 1, wherein the scanner reads the conveyed plurality of sheets continuously.

9. A control method for an image processing apparatus having a scanner, a document feeder configured to convey a plurality of sheets to be read by the scanner, and a sensor configured to detect double feeding of sheets conveyed by the document feeder, the control method comprising:
setting provision of a preview screen to enabled or disabled;
providing, if double feeding of sheets is detected by the sensor, a preview screen including a message indicating that the double feeding has been detected, and image data corresponding to one or more sheets read by the scanner; and
providing a first option to cancel reading processing of the plurality of sheets including the one or more sheets in the image processing apparatus, and providing a second option to perform re-read processing based on a designated page corresponding to a sheet that is read by the scanner prior to the sheets corresponding to the detected double feeding,
wherein, even if the provision of the preview screen is set to disabled, the preview screen including the message and the image data is provided if double feeding of sheets is detected by the sensor.

10. A non-transitory computer-readable storage medium storing a program to cause a computer to perform a control method for an image processing apparatus having a scanner, a document feeder configured to convey a plurality of sheets to be read by the scanner, and a sensor configured to detect double feeding of sheets conveyed by the document feeder, the control method comprising:
setting provision of a preview screen to enabled or disabled;

providing, if double feeding of sheets is detected by the sensor, a preview screen including a message indicating that the double feeding has been detected, and image data corresponding to one or more sheets read by the scanner; and providing a first option to cancel reading processing of the plurality of sheets including the one or more sheets in the image processing apparatus, and providing a second option to perform re-read processing based on a designated page corresponding to a sheet that is read by the scanner prior to the sheets corresponding to the detected double feeding, wherein, even if the provision of the preview screen is set to disabled, the preview screen including the message and the image data is provided if double feeding of sheets is detected by the sensor.

* * * * *